United States Patent Office 2,894,633
Patented July 14, 1959

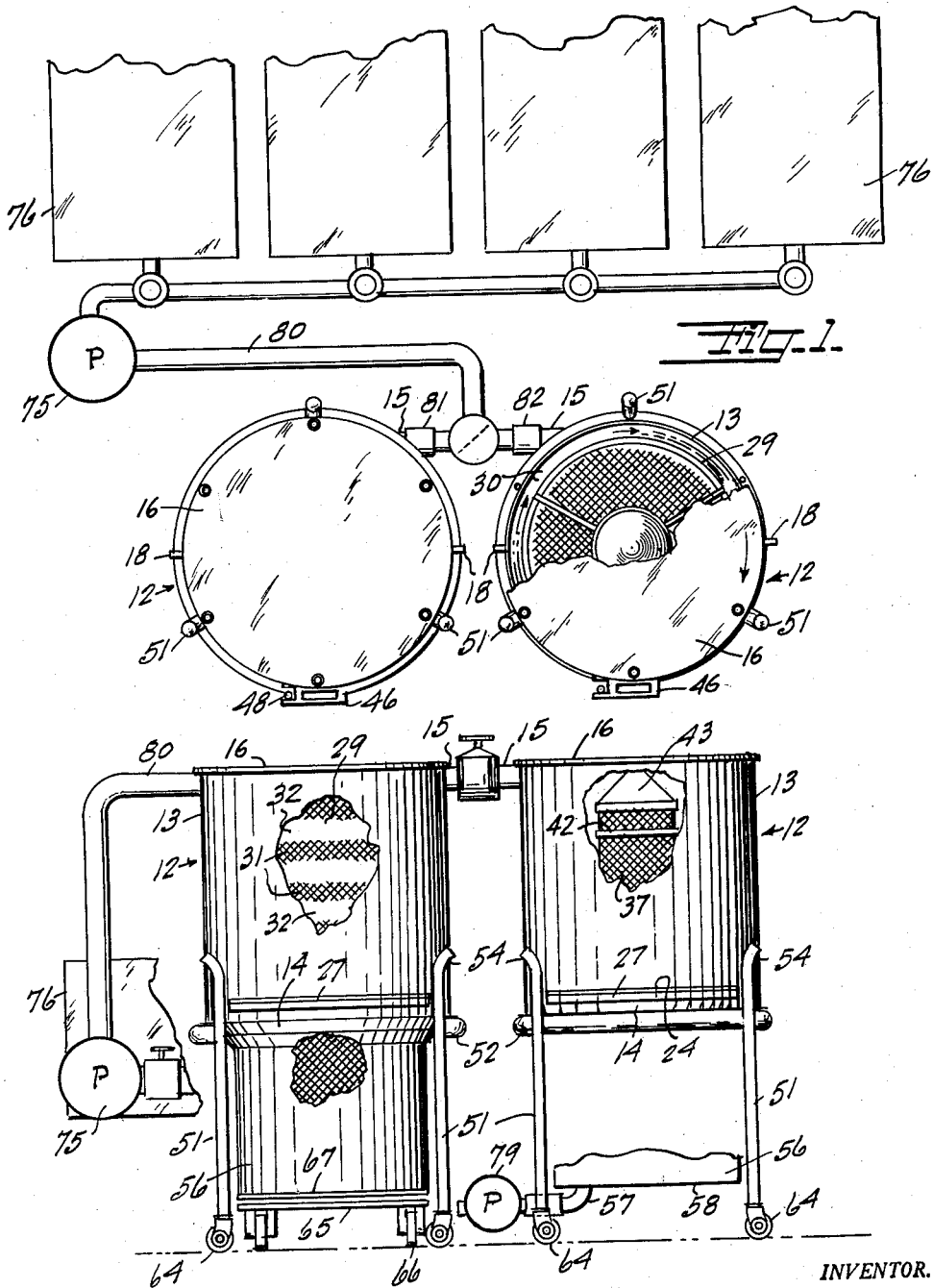

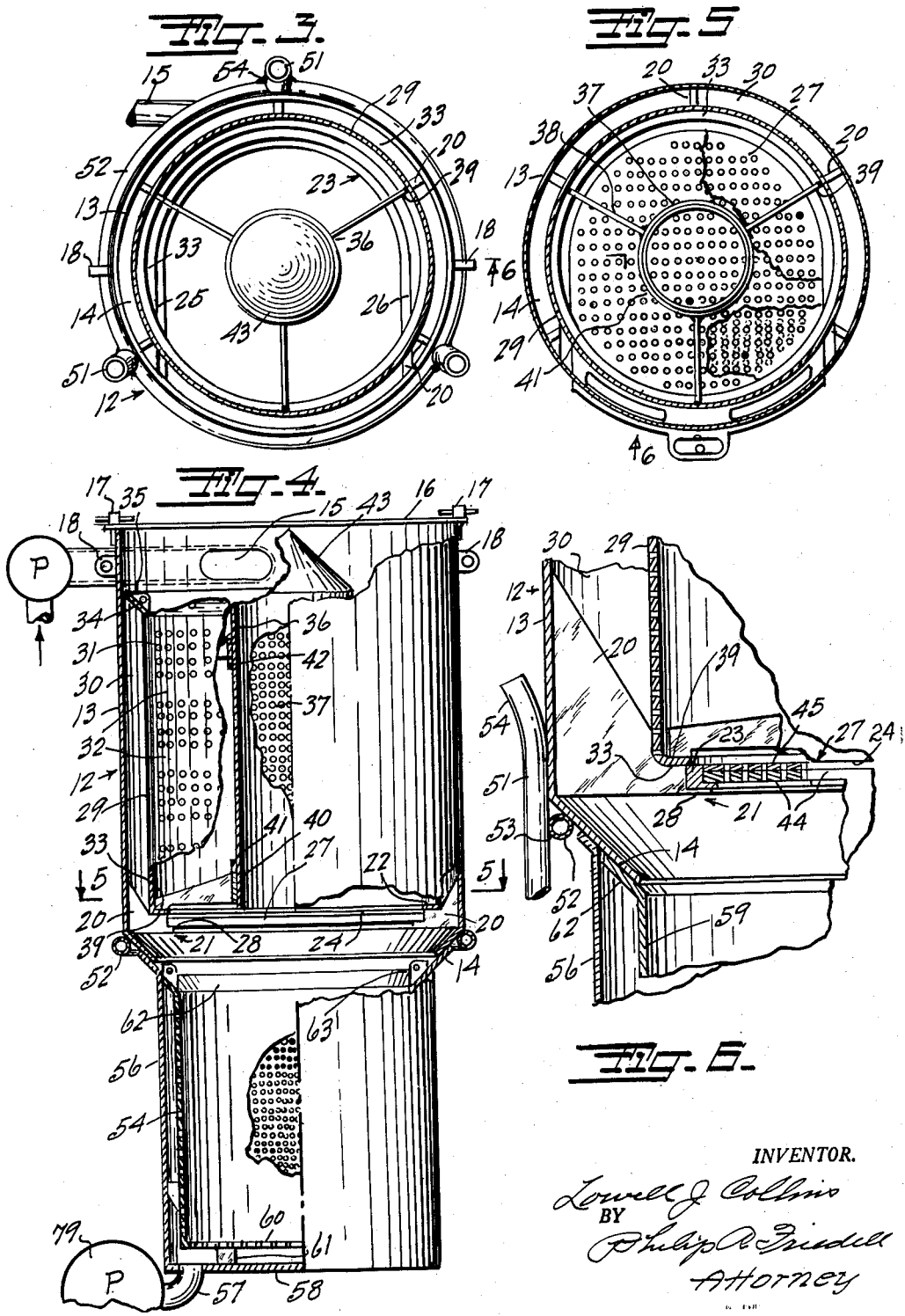

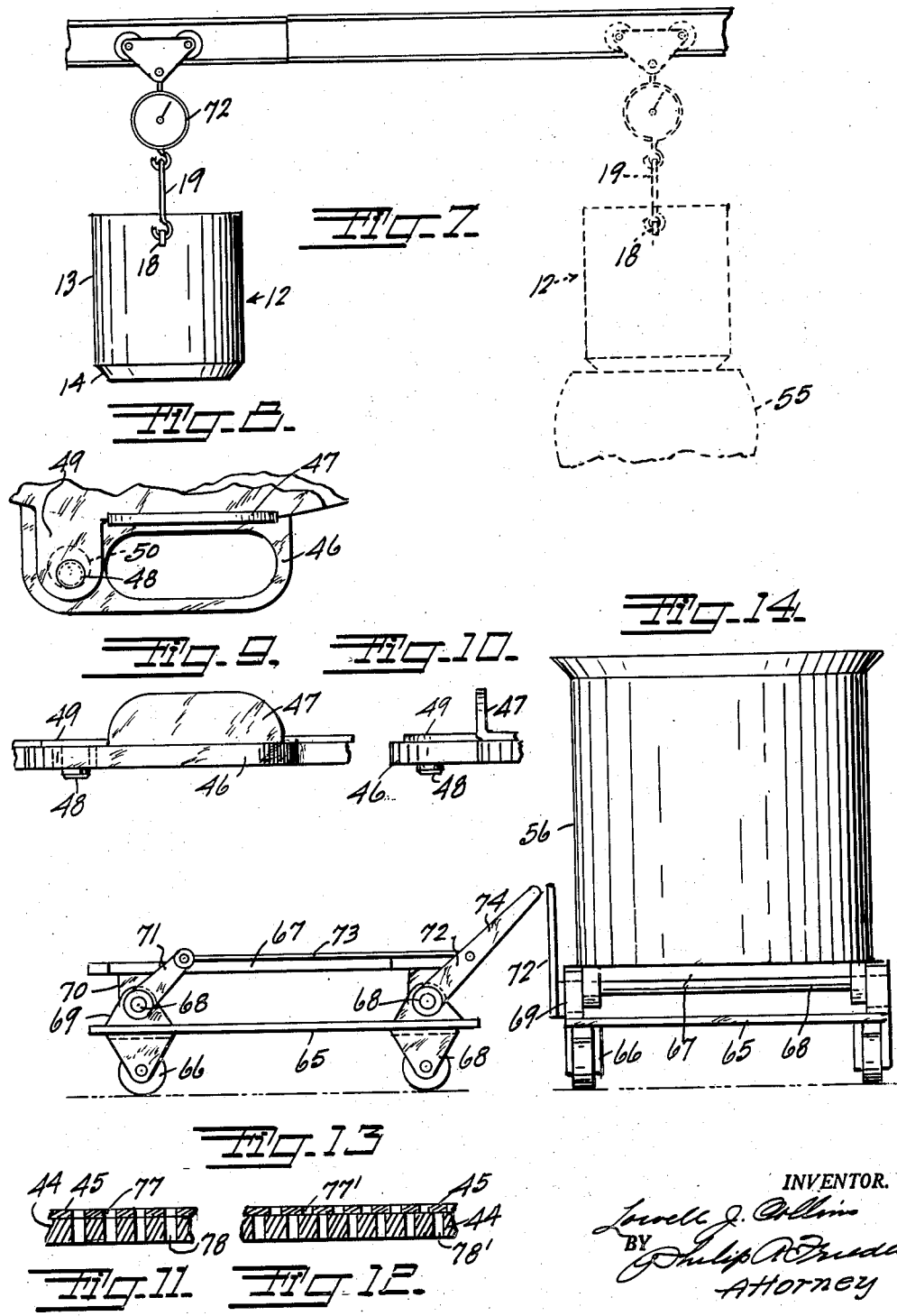

2,894,633

FOOD STRAINER

Lowell J. Collins, Oakland, Calif.

Application May 27, 1957, Serial No. 661,858

16 Claims. (Cl. 210—341)

This invention relates to means for quickly and efficiently straining and draining various food products, such as the elimination of wash water from milk curd for making cottage cheese, as also for draining of wash water or other liquids from fruits, vegetables and other materials, and provides a system which is particularly adapted to the elimination of wash water under sanitary and practically bacteria-free conditions previous to the operation of mixing the prepared or processed curd with cream, and additionally provides a system in which the elimination of water from the curd can be controlled to a predetermined water content.

It is desirable to maintain the curd out of contact with fair following the initial processing steps including washing of the curd so as to maintain the keeping qualities of the cottage cheese for a maximum period through isolation from the various types of bacteria prevalent in the air, and this is accomplished through the straining and draining of the curd in a closed system.

It is also desirable to maintain continuous production so that a definite batch of material can be completely processed without requiring intermediate cleaning of the various apparatus, and so that this definite batch can be completed without interruption, and these desirable features are accomplished by my system through a pair of strainers which are alternately placed in circuit, the curd from one being delivered to the mixer while the curd is being strained and drained in the other.

The objects and advantages of the invention are as follows:

First, to provide a system for rapidly straining wash water from milk curd and the like.

Second, to provide a system as outlined in which elimination of wash water can be carried out as a continuous process through the selective use of a pair of strainers.

Third, to provide a system as outlined in which elimination of wash water is carried out in a condition substantially isolated from the atmosphere to maintain the curd as free of air-carried bacteria as possible.

Fourth, to provide a system as outlined in which elimination of water can be controlled at will for retention of a predetermined water content in the curd.

Fifth, to provide a system as outlined in which the curd-washwater pulp is formed to the strainer and delivered therein under cyclonic action for partial segregation to promote rapid elimination of the wash water.

Sixth, to provide a system as outlined in which the strainer is provided with successive perforate and imperforate spaced annular sections for more rapid elimination through successive free movements of the pulp as it descends.

Seventh, to provide a system in which the strainer is provided with an axially located auxiliary straining cylinder.

Eighth, to provide a system as outlined with a strainer having a combination convertible bottom screen and gate.

In describing the invention reference will be had to the accompanying drawings, in which:

Fig. 1 is a top plan view of the invention with a portion of the cover of one strainer broken away to show the interior construction.

Fig. 2 is a front elevation of Fig. 1 with portions of the front walls broken away to show the interior construction and parts of the strainers.

Fig. 3 is an enlarged top plan view of one of the strainers with the cover removed, and the strainer partly shown in section and with the combination convertible bottom screen and gate removed.

Fig. 4 is a half sectional front elevation of Fig. 3.

Fig. 5 is a section taken on line 5—5 of Fig. 4.

Fig. 6 is a fragmentary sectional elevation drawn to a greatly enlarged scale and is taken on a line 6—6 of Fig. 5, and with a portion of one support leg added.

Fig. 7 is a diagrammatic view indicating the weighing and transfer of one of the strainer units to the mixer for completing the processing of cottage cheese.

Fig. 8 is a fragmentary view of the control for the combination convertible bottom screen and gate, and drawn to a greatly enlarged scale.

Fig. 9 is a front elevation of Fig. 8.

Fig. 10 is a side elevation of Fig. 9.

Fig. 11 is a fragmentary view shown in section of the combination convertible bottom screen and gate adjusted to one stop position to form the bottom screen.

Fig. 12 is another fragmentary sectional view showing the combination convertible screen and gate adjusted to the other stop position to form a gate for the bottom.

Fig. 13 is a side elevation of a transfer truck and illustrating one suitable type of elevating and lowering means for the auxiliary strainer.

Fig. 14 is an end elevation of Fig. 13, and showing an auxiliary or secondary strainer supported thereon.

The invention consists of a pair of two-stage strainers, each including a main strainer 12 consisting of an external cylindrical shell 13 having an inwardly flanged bottom end 14 and having an inlet 15 entering tangentially at the top so as to provide a cyclonic action to the pulp and thus cause initial segregation of the liquid and solids for more rapid straining. A cover 16 is suitably secured as indicated at 17, and bail ears 18 are diametrically located to provide for transfer of the main strainer to the mixer for mixing, for example, cottage cheese following elimination of the wash water; the transfer apparatus Fig. 7 being provided with a bail 19.

Inwardly projecting brackets 20 are located at the lower end of the shell 13 and form combination supporting and guiding means for the main screen, these brackets being inwardly and downwardly inclined to guide the main screen and stepped as shown at 21 for support of the main screen through its inturned bottom flange 33 resting on the top step 22. A substantially U-shaped guide 23 is supported on the lower step 28 of these brackets, and an opening 24 is provided through the front of the shell with the lower edge of the opening in a plane coincident with the lower step 28, the width of the opening being substantially equal to the span between the shoulders 25 and 26 of the guide 23.

The combination convertible screen and gate 27 is supported on the step 28 and fits between the shoulders 25 and 26.

The main screen 29 is slightly spaced from the shell as indicated at 30, the spacing being one to two inches, depending on the diameter and capacity of the unit, just sufficient to provide free flow of drainage, and this screen is also cylindrical in form, though neither the shell or the screen is so limited but so made for practical reasons, and also consists of a cylindrical shell having a vertical series of perforate and imperforate bands as indicated at 31 and 32, this arrangement preventing hanging up of the curd, permitting free travel along the imperforate bands with increased peripheral flow before reaching the next perforate band and thus effecting a cleaning of the perforations and create more rapid draining.

The lower end of this main screen is flanged inwardly as indicated at 33 while the upper end is flanged outwardly to meet the wall of the shell as indicated at 34, in a plane just below the intake 15, to direct all curd with its wash-water directly into the main screen. Bail ears 35 are also provided for convenient removal of the main screen from the shell.

A cylindrical perforate screen 37 is located axially in the main screen and is supported by two spiders 36 and 38 respectively at the upper and lower ends, the legs of the lower spider resting on the inturned flange 33 of the screen as indicated at 39, while the ring 40 cooperates with a support ring 41 which is fixed on the axial screen. The upper spider is identical with the exception that a ring 42 is provided on the exterior periphery of the axial screen for supporting the spider, thus permitting the spiders and the axial screen to be removed and separated at will for cleaning and sterilization.

This axial screen is open at the bottom and may be perforated throughout its height or may be band perforated similar to the main screen, and is provided with a removable impervious cap 43 which is conically formed to shed all material, similar to the flanges which are shown tapered for the same reason.

The combination convertible strainer and gate consists of a main support perforate screen 44 which has sufficient rigidity to support the weight of the contents of the main screen, and a closure plate 45 which is formed of relatively thin material, the two being perforated in registry when the peripheries are in registry, the spacing longitudinally of the plates being slightly greater than the diameter of the perforations, for ⅛ inch perforations the spacing longitudinally should be $\frac{5}{32}$ to $\frac{3}{16}$ inch, while transversely the spacing can be as close as desired. Both of these plates extend through the opening 24 in the front of the shell, the lower or supporting plate 44 terminating in a handle 46 while the closure plate 45 is provided with a holdback lip 47, and cooperative stop means is provided between the two, and is indicated as consisting of a stop pin 48 which is fixed in an extension 49 on the closure plate and which pin operates in a hole 50 which is only sufficiently large to permit relative movement of the two plates a distance equal to one half the longitudinal pitch of the perforations. Thus, when the support plate 44 is pushed in as far as it will go, the two screens 44 and 45 will be in registry as indicated in Fig. 11. When drainage is to be stopped, the handle 46 is pulled outwardly until the pin 48 engages the opposite wall of the hole 50, pressure being applied to the lip 47 if necessary to prevent any withdrawal of the closure plate.

The support for this unit consists of legs 51 which may be formed of any suitable structural shape, tubular legs being shown because of ease of cleaning, the legs being tied together by suitable structural members such as the tubular member 52 which coincidently provides a seat for the lower end of the main strainer shell as indicated at 53, the upper ends of the legs being curved outwardly as indicated at 54 to provide guides when the main strainer unit is replaced following transfer of the drained curd to the mixer 55.

The secondary strainer consists of an imperforate container 56 which is flanged outwardly at the upper end to cooperate with the inturned flange 14 on the main strainer shell to exclude air, a discharge connection 57 being provided in the bottom 58. A cylindrical screen is supported in the container 56 with the side walls 59 suitably spaced from the side walls of the container, and the bottom wall 60 suitably spaced from the bottom 58 of the container as by supports 61. The side walls and bottom of the secondary screen 54 are perforated throughout their extent, the perforations being considerably smaller than those in the main screen, about $\frac{1}{16}$ inch proving satisfactory to catch the fines which may pass through the main screen. The upper end of this secondary screen is also flanged outwardly, preferably tapered as indicated at 62 with the peripheral edge cooperating with the inner periphery of the container immediately below the flange on the container, this secondary screen also being provided with bail ears 63 to facilitate removal from the container for recovery of the curd fines, and for cleaning and sterilization.

The main strainer can be used alone if desired, in which case air will not be excluded as when the entire unit is used, and the curd fines will not be recovered but will be washed away with the drainage.

The unit may be provided with casters as indicated at 64 to permit moving to various locations, as for washing and sterilization.

An ordinary flat hand truck can be used for placing the secondary strainer in position, since the lower end of the main strainer and top of the secondary strainer are formed to funnel, but under such conditions the atmosphere would be accessible to the curd and thus increase the bacteria count, therefore some type of raising means, such as a lift truck should be used and may be of any suitable type, one type being illustrated in Figs. 2, 13 and 14, in which the truck bed 65 is supported on casters 66, and the lift platform 67 is supported by an eccentric shaft 68 at each end in the paired bearings 69 and 70 fixed respectively to the top of the bed and to the underside of the lift platform, the two eccentric shafts being connected for simultaneous operation through the levers 71 and 72 connected by the connecting rod 73, one of the levers being provided with a handle extension 74, though not so limited, for manual operation to lift the lower or secondary strainer into air excluded contact with the bottom flange of the main strainer shell.

Ordinarily the pair of units is operated by a single pump 75 which pumps the pulp from the processing tanks 76 selectively, a fresh batch of curd being transferred to the processing tanks as they are emptied to provide a continuous chain of processing, washing, straining, and mixing.

The pulp, or curd with its wash-water is pumped tangentially into the upper part of one of the shells through the inlet 15 to provide cyclonic action to the pulp which causes an initial segregation to cause rapid elimination of water, with the imperforate bands providing areas of free movement of the curd and water and thus keeping the screen bands more free of blocking curd and thus increasing the rapidity of straining of the water from the curd.

It will be noted that the plates 44 and 45 are pushed into the bottom of the shell as far as they will go, which causes the perforations 77 and 78 to line up in perfect registry.

Straining is effected through the walls of the main strainer as also through the bottom, and also through the axial strainer, the wash water and any fines discharging into the secondary strainer where the fines are caught by the smaller perforations with the water discharging through the outlet 57, or, for more rapid straining, a pump 79 may be connected to this discharge to create a partial vacuum so that the two ends of the unit are operated respectively under pressure and vacuum.

When one strainer is filled to the desired degree, the curd is permitted to drain until the water content of the curd has been reduced to a predetermined value, after which the handle 46 is retracted while the closure plate 45 is retained against movement, permitting the support plate 44 to be retracted only as far as the pin 48 in hole 50 permits, at which stage the holes or perforations in the support plate and closure plate are completely out of registry as indicated at 77' and 78' in Fig. 12, forming a gate for closing the bottom of the main strainer.

Quick-detachable connections are provided from the pump line 80 to the respective main strainer units as indicated at 81 and 82 indicated as elastic sleeves, though any suitable sanitary quickly detachable connection may be used.

After the gate has been closed and the pump line disconnected from the main strainer unit, the entire unit is picked up by the bail 19, weighed, and transferred to the mixer 55 as indicated in Fig. 7, the gate being completely retracted to dump the curd into the mixer, then replaced with both plates pushed into their seat as far as they will go, forming a screen bottom, the unit is then transferred back to its support ready for another operation. In the meantime the other unit has been filled to the desired degree and the same operation takes place, with the first unit being again connected to the pump line. The secondary strainer requires no attention until the entire batch of curd has been dewatered and sent to the mixer, after which the fines are collectd and sent along with the final batch, or processed separately.

When a batch is completed, the entire unit must be thoroughly washed and sterilized, and this is readily and easily accomplished since the units are completely disassembleable.

In the main strainer unit, the main screen is removable from the shell, the cover is removable from the axial strainer, the axial strainer is removable from the spiders, and the spiders are removable from the main strainer. The support and closure plates for the gate are separable, the secondary screen is removable from the container, and both, the main and secondary units are removable from the support frame.

I claim:

1. A food strainer, in combination, a shell having a removable cover and having gate supporting and guiding means at the lower end, a screen within said shell and slightly spaced from the walls of the shell and having a flange at the upper end cooperative with the wall of the shell in spaced relation below said cover, an intake passage for food material entering tangentially and located between the cover and said flange, said screen being supported by said gate supporting means, and a convertible screen and gate supportable by said supporting and guiding means and removable at will through a passage provided through the wall of the shell.

2. A structure as defined in claim 1, said screen being flanged inwardly at the lower end, a second screen located axially in said first mentioned screen, and a spider support for the lower end of said second screen and comprising a ring encircling said second screen and arms extending from said ring with the ends of the arms supported by the inwardly flanged lower end of the first mentioned screen, and support means on said second screen for cooperation with said ring, whereby said screens and spiders are removable from said shell at will for washing and sterilization, said screens extending downwardly to substantial contact with said gate.

3. A structure as defined in claim 1, said shell being inwardly flanged at the lower end, a second strainer unit including a container having an outwardly formed flange for cooperation with said inwardly flanged lower end, and a third screen within said container and spaced from the walls thereof and having a flange at the upper end cooperative with the walls of said container, and a discharge passage in the bottom of said container.

4. A food strainer comprising, a cylindrical shell having an inturned flange at the bottom and having a cover for the top, a cylindrical screen within said shell and slightly spaced from the walls thereof and having an outturned flange at the upper end cooperative with the walls of the shell in spaced relation below said cover, an intake passage entering tangentially through said shell between said cover and said outturned flange, combination supporting and guiding means at the lower end of said shell with said cylindrical screen supported thereon, and a combined convertible screen and gate slidably supported by said supporting and guiding means and removable and replaceable at will through a passage provided through the wall of the shell.

5. A structure as defined in claim 4, supporting means for supporting said shell in an elevated position, a container having an outturned flange at the upper end for cooperation with said inturned flange for excluding air, a second screen within said container and spaced from the walls thereof and from the bottom of the container and having a bottom and having an outturned flange at the upper end cooperative with the walls of the container, and a discharge passage provided through the bottom of said container.

6. A structure as defined in claim 5, a cylindrical perforate screen supported axially in said first mentioned screen and having a removable impervious cap conically formed to prevent accumulation of material thereon.

7. A structure as defined in claim 6, said combined convertible screen and gate comprising two plates each having a multiplicity of screen perforations and registrable in one position to form a screen, and being out of registry to form a closure gate when one is moved to another position relative to the other, and stop means cooperative between the plates for limiting movement to the two relative positions.

8. A structure as defined in claim 7; said support means for supporting said shell in an elevated position comprising equiangularly spaced legs, and an inwardly projecting band connecting said legs and providing a support for the inturned flange on the shell, the upper ends of said legs being turned outwardly to provide guiding means for the shell while being lowered onto the support.

9. A food strainer comprising, a main strainer including a shell having a cover, a main screen within said shell and having an outturned flange at the top cooperative with the walls of the shell, a pump line entering said shell tangentially between said outturned flange and said cover, supporting means in said shell for supporting said screen, and a bottom screen for said main screen and supportable by said supporting means in cooperation with the bottom of said main screen and being removable at will for discharging the contents following the straining operation.

10. A food strainer comprising, a shell having a removable cover for the top and an inturned flange at the bottom, a plurality of spaced stepped supports affixed to the walls at the lower end of said shell, an intake passage entering said shell immediately below said cover, a main screen spaced from the walls of the shell and having an outturned flange at the upper end cooperative with the walls of the shell immediately below said intake passage and having an inturned flange at the lower end, a substantially U-shaped combination supporting and guiding means supported by said brackets and with said main screen supported thereon, a combination convertible plate screen and gate slidable on said guiding means and relatively movable to two positions in one of which the screen passages are in registry to form a screen, and in the other of which the screen passages are relatively staggered to form a closure and gate, and stop means cooperative between the two members for limiting relative movement to said two positions, said combination convertible plate screen and gate being removable at will through a passage provided through the wall of the shell.

11. A structure as defined in claim 10, an axial screen having a removable impervious cap removable at will for cleaning and having exterior supports respectively at the upper and lower ends, a spider for the lower end including a ring to encircle the axial screen and a plurality of legs supportable on said inturned flange with the supports at the lower end cooperative with the top of the ring, and a like spider for the upper end of said axial screen with the ring supported on said supports at the upper end with the legs cooperative with the walls of the shell for maintaining the position of the axial screen in the main screen, said axial screen extending down to said combination convertible plate screen and gate.

12. A structure as defined in claim 10, said main screen having alternate bands of perforate and imperforate wall throughout the height thereof for alternate free and screening action of the material being strained to maintain the perforate bands free of clogging.

13. A structure as defined in claim 10, combination support and guiding means for guiding said shell to the support position upon lowering and for supporting said shell in an elevated position, and a container having a top end cooperative with the inturned flange on the bottom of the shell for sealing contact, and a secondary strainer in said container for recovery of fines from the main screen, and a discharge outlet on said container.

14. A continuous production food strainer comprising two main strainer units each including a shell having a removable cover, a main strainer supported within said shell and spaced from the walls of the shell, said main strainer having a flange at the top cooperative with the walls of the shell in spaced relation below said cover, and an intake passage entering tangentially between said flange and said cover, said shell and main screen being bottomless, and gate support means at the lower end of said shell and providing support for said main screen, and a combined screen and gate removably supported by said gate support means and removable at will through a passage provided through the wall of the shell, and a selective connection to the two main strainer units for selective delivery of food for straining to the respective strainer units.

15. A continuous production food strainer as defined in claim 14, a secondary strainer unit cooperative with each main strainer unit and comprising a container having a top cooperative with the bottom end of said shell for sealing contact to exclude air, a screen having a bottom and walls and spaced from the bottom and walls of the container and having a flange at the top cooperative with the walls of the container for discharge of all liquids from the main strainer into the secondary strainer for recovery of fines, and a discharge connection on said container, and supporting means for said main strainer unit, for removably supporting the main strainer in an elevated position for reception of the secondary strainer unit therebeneath.

16. A strainer for food products comprising a cylindrical shell having a series of alternate perforate and imperforate bands extending throughout the height of the walls to provide clearing action with increased straining efficiency through accelerated and unimpeded action of the material being strained when passing over and about the imperforate bands, an impervious shell surrounding said cylindrical shell and spaced therefrom and including supports at the lower end for supporting said cylindrical shell, said impervious shell extending above the top of said cylindrical shell and having an intake passage between the top of the cylindrical shell and the top of the impervious shell, and a cover for said impervious shell, and a combination screen and gate for the lower end of said cylindrical shell and supported by said impervious shell and removable at will through a passage provided through the wall of the impervious shell.

References Cited in the file of this patent

UNITED STATES PATENTS

| | | |
|---|---|---|
| 308,575 | Puffer | Nov. 25, 1884 |
| 827,168 | Meyer | July 31, 1906 |
| 831,767 | Boden | Sept. 25, 1906 |
| 2,466,158 | Di Salino | Apr. 5, 1949 |
| 2,770,426 | Sievers | Nov. 13, 1956 |